Patented Sept. 7, 1954

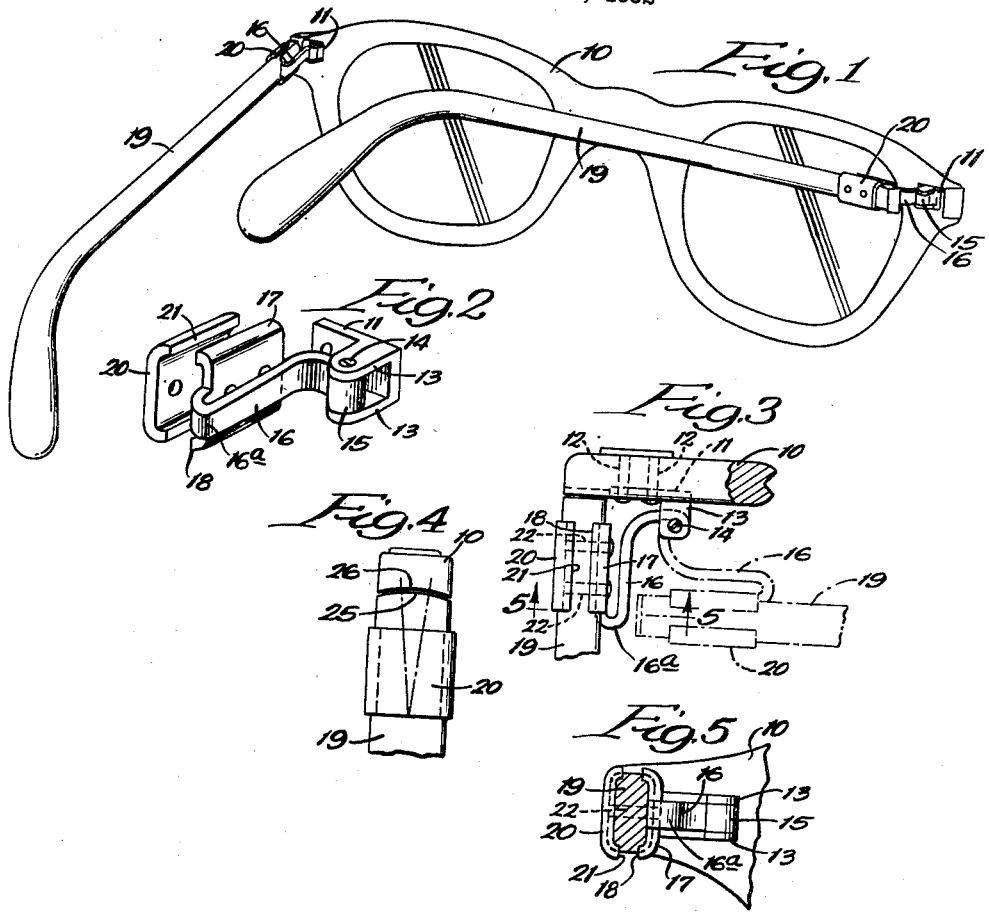

2,688,274

UNITED STATES PATENT OFFICE 2,688,274

EYEGLASS FRAME AND HINGE STRUCTURE THEREFOR

Austin B. Belgard, Evanston, Ill.

Application February 15, 1952, Serial No. 271,812

4 Claims. (Cl. 88—53)

1

This invention relates to eyeglass frames and hinge structure therefor. More particularly, the invention relates to an improved design of hinge construction with a novel form of articulation of the frame front and temple permitting angling of the temple against the front of the frame to aid in adjusting the eyeglasses on the patient's face for both retinascopic and pantascopic tilt as well as leveling left to right.

In the conventional type of eyeglass or spectacle frame, it is common to adjust the temple and frame structure by bending the structure near the point of connection of the parts, with the result that the hinge is bent or loosened and an unsatisfactory, weakened frame results. There has long been a need for a frame and hinge structure therefor which will permit the adjustment to be accomplished without strain on the hinge plate rivets or hinge barrel on either the front or temple or creating undue torsion upon the rim groove, while at the same time permitting angling of the temple against the front of the frame to aid in adjusting the spectacles on the patient's face for both retinascopic and pantascopic tilt as well as leveling from left to right.

An object of the present invention is to overcome the above difficulties described and to accomplish the new results desired. A further object is to provide a structure which permits perfect articulation of the temple and frame front while permitting angling of the temple without producing strain on the hinge plate rivets or hinge barrel. Other specific objects and advantages will appear as the specification proceeds.

The invention is shown in an illustrative embodiment by the accompanying drawing, in which—

Figure 1 is a perspective view of a frame structure embodying my invention; Fig. 2, an enlarged perspective view of the hinge structure employed; Fig. 3, a broken top plan view of the hinge structure shown in Fig. 1; Fig. 4, an end view in elevation of the frame front and showing the temple abutting the front; and Fig. 5, a detail sectional view, the section being taken as indicated at line 5—5 of Fig. 3.

In the illustration given, 10 designates a glasses frame or frame front. Embedded in the rear portion of the front 10 at each end thereof is a hinge plate 11 which may be further secured in position by pins 12, as shown best in Fig. 3. Formed integrally with plate 11 are the rearwardly-extending spaced flanges 13 apertured to receive a vertical hinge pivot 14. The pivot 14

2 extends through a hinge barrel 15 formed integrally with the metal support strap 16. In the illustration given, the support strap 16 is formed integrally with a temple plate 17.

The temple plate 17 is provided with inwardly-turned ends 18 adapted to engage the top and bottom portions of the temple 19 and on the opposite side of plate 17 is a companion plate 20 having inwardly-turned ends 21 engaging the top and bottom portions of the temple. Rivet pins 22 may be passed through the plates 17 and 20 to anchor the plates firmly to the temple 19.

By engaging the temple 19 with pliers which grip the plates 17 and 20 and also engaging the strap 16 adjacent the hinge plate 11 with pliers, reverse rotation between the pliers will cause the temple strap support 16 to bend at about point 16a to permit angling of the temple against the front of the frame. Thus, without bending the temple or straining the hinge or hinge plate rivets or barrel, the temple may be angled against the front of the frame to adjust the eyeglasses on the patient's face for both retinascopic or pantascopic tilt and for leveling left to right. This change does not interfere in any way with the perfect pivoting of the hinge which allows the temples to swing inwardly in the folded position.

If it is desired to shorten the distance between the frame front and the temples 19 when they are in folded position, the support strap 16 may have a shorter arc into the hinge barrel, permitting a flatter fold of the temple against the frame.

The type of construction is not limited to plastic frames, but can be applied to plastic and metal or all metal frames as well. Further, the hinge barrel construction is not limited to the 5-barrel type as shown, but may also be single action, 3-barrel or 7-barrel, as now used in the industry, or of any other suitable construction.

By employing the plates 17 and 20, the temple 19 is protected during the bending operation because the pliers engage the plates at the upper and lower ends thereof while the strap 16 is engaged and is being rotated between the pliers to tilt or adjust the temple with respect to the frame. The malleable or bendable metal strap 16 thus permits all of the adjustment without causing strain upon the hinge plate or temple or creating undue torsion upon the rim groove. Further, the supporting of the temple with its forward end adjacent but free of the front frame, permits the temple to be adjusted while still keeping the front end of the temple in close relation with the frame front. I prefer to provide the front end 25 of the temple 19 with an arcuate surface corresponding to the concave arcuate surface 26 adjacent thereto on the frame front 10, as shown more clearly in Fig. 4. Thus, when the temple 19 is angled to the right or left with respect to the front 10, the arcuate surfaces of the two parts permit this change to be made without changing the close relation of the parts, as illustrated. The resilient strap 16 further serves as a cushioning member between the free end of the temple 19 and the adjacent curved portion 26 of frame 10. The drawing shows a butt articulation between the front of the frame and the temple. However, any other suitable form of articulation such as, for example, a 45° angular articulation may be used.

While in the foregoing specification, I have set forth a specific structure in considerable detail for the purpose of illustrating embodiments of the invention, it will be understood that such details of structure may be varied widely by those skilled in the art without departing from the spirit of my invention.

I claim:

1. In a spectacle frame structure, a frame adapted to receive lenses, at least one temple having a free end portion adjacent an outer edge of said frame and adapted to be secured thereto, and an elongated bendable strap pivotally secured adjacent an end thereof to said frame and extending freely therefrom along said temple and in generally parallel relation therewith, said strap being doubled upon itself to provide a generally reversely directed end, and means securing said reversely directed end to said temple adjacent the free end portion thereof.

2. In a spectacle frame structure, a frame adapted to receive lenses, at least one temple having a free end portion adjacent an outer edge of said frame and adapted to be secured thereto, and an elongated bendable member pivotally secured adjacent an end thereof to said frame and extending freely therefrom along said temple and in generally parallel relation therewith, said member being doubled upon itself to provide a generally reversely-directed end laterally offset with respect to the portion of the member secured to said frame, and means securing said offset portion of said reversely-directed end to said temple adjacent the free end portion thereof.

3. The structure of claim 2, in which the reversely-directed end portion lies in the same horizontal plane with the first-mentioned portion of the member secured to said frame.

4. In a spectacle frame structure, a frame adapted to receive lenses, at least one temple having a free end portion adjacent an outer edge of said frame and adapted to move bodily with respect to said frame portion, and an elongated, bendable member pivotally secured adjacent an end thereof to said frame and extending freely therefrom along said temple, said member being doubled upon itself to provide a reversely-directed end, and means securing said reversely-directed end to said temple adjacent the free end portion thereof, whereby said member may be bent at a point remote from the point of attachment of the member to the frame so as to vary the tilt of the free end of the temple with respect to said frame front.

References Cited in the file of this patent

UNITED STATES PATENTS

| Number | Name | Date |
|---|---|---|
| 1,649,794 | Stevens | Nov. 15, 1927 |
| 2,281,812 | Uhlemann et al. | May 5, 1942 |
| 2,365,163 | Alexander | Dec. 19, 1944 |
| 2,474,119 | Rohrbach | June 21, 1949 |

FOREIGN PATENTS

| Number | Country | Date |
|---|---|---|
| 287,764 | Great Britain | Mar. 29, 1928 |
| 384,198 | Great Britain | Dec. 1, 1932 |
| 660,104 | Germany | May 17, 1937 |
| 434,783 | Italy | May 4, 1948 |
| 657,948 | Great Britain | Sept. 26, 1951 |